INVENTOR.
Earl L. Scheidenhelm
BY
Atty.

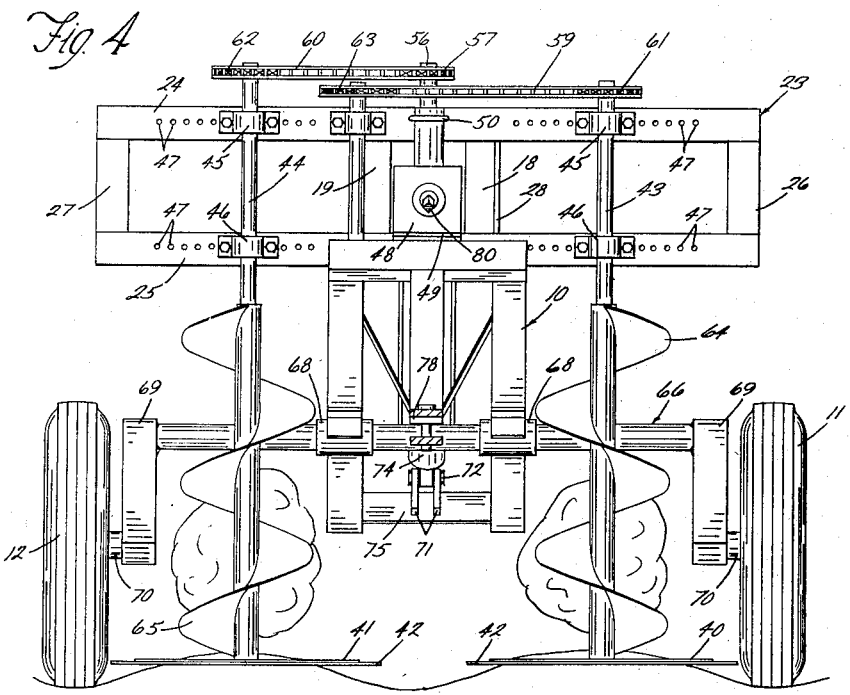

United States Patent Office 2,930,436
Patented Mar. 29, 1960

2,930,436

CUTTER FOR VINE CROPS

Earl L. Scheidenhelm, Mendota, Ill., assignor to Horace D. Hume, Mendota, Ill.

Application November 29, 1956, Serial No. 625,029

2 Claims. (Cl. 172—78)

The present invention relates to improvements in harvesting equipment, and more particularly to improvements in cutters for vine crops such as lima beans and the like.

In harvesting certain vine crops such as lima beans, etc., considerable difficulty is experienced due to the fact that the crop, or part of it, actually rests upon the ground. Vine crops are generally planted in rows and cultivated during the growing season in such a manner that ridges of loose soil are formed in the rows covering the root crown of the plants. The seed pods often rest upon these ridges of dirt in such a manner that harvesting by cutting above the ground surface destroys a substantial portion of the crop. Harvesting by pulling or digging the whole plants has been suggested as a solution to this problem but has been found unsatisfactory in many respects. For example, this type of harvesting results in gathering large amounts of dirt with the crops, and also results in depriving the soil of the nourishment normally derived if the roots of the plants are allowed to remain in the ground.

Harvesting by cutting the plants below the ground level and immediately below the crown of the plant has proved to be the most successful since this operation neither destroys that portion of the crop resting on ground, nor removes the roots and dirt with the plants. It is the principal purpose of this invention to provide simple and efficient cutter for vine crops which will sever the crop below the ground level without disturbing the crop or the roots of the plants.

A further purpose of the invention is to provide such a cutting mechanism wherein the cutting element is mounted for yielding rearward and upward movement whereby to yield to hard objects such as rocks, etc. embedded in the ground without breakage.

A still further purpose of the invention is to provide, in combination with the cutting mechanism, a crop elevating and windrowing device operable to form the cut crop into windrows for easier handling.

My invention comprises, essentially, a pair of cutting disks arranged in a substantially horizontal plane and spaced apart a distance equal to the distance between adjacent rows of crops to be cut. The disks are carried and driven by vertical shafts suspended from a transverse vertical rectangular frame mounted on a wheeled main frame. The vertical shafts are provided with auger sections which elevate and move the crop into a windrow between the cutting disks, as it is cut. In order to provide for yielding by the disks on encountering a submerged obstruction, the transverse shaft carrying frame is pivotally supported to the main frame on a horizontal transverse axis. With this construction, the disks may move rearwardly and upwardly to by-pass any obstruction.

The nature and advantages of my invention will appear more fully from the following description and the accompanying drawings, where a preferred form of the invention is shown. The drawings and description are intended to be illustrative only, however, and should not be understood as limiting the invention except insofar as it is limited by the claims.

In the drawings:

Figure 4 is a fragmentary sectional view taken substantially on the line 4—4 of Figure 1;

Figure 5 is an enlarged fragmentary sectional view taken substantially on the line 5—5 of Figure 2, and illustrating the manner in which the cutting disks sever the stalks of the crop; and Figure 6 is an enlarged fragmentary sectional view taken on the line 6—6 of Figure 1.

Figure 1:
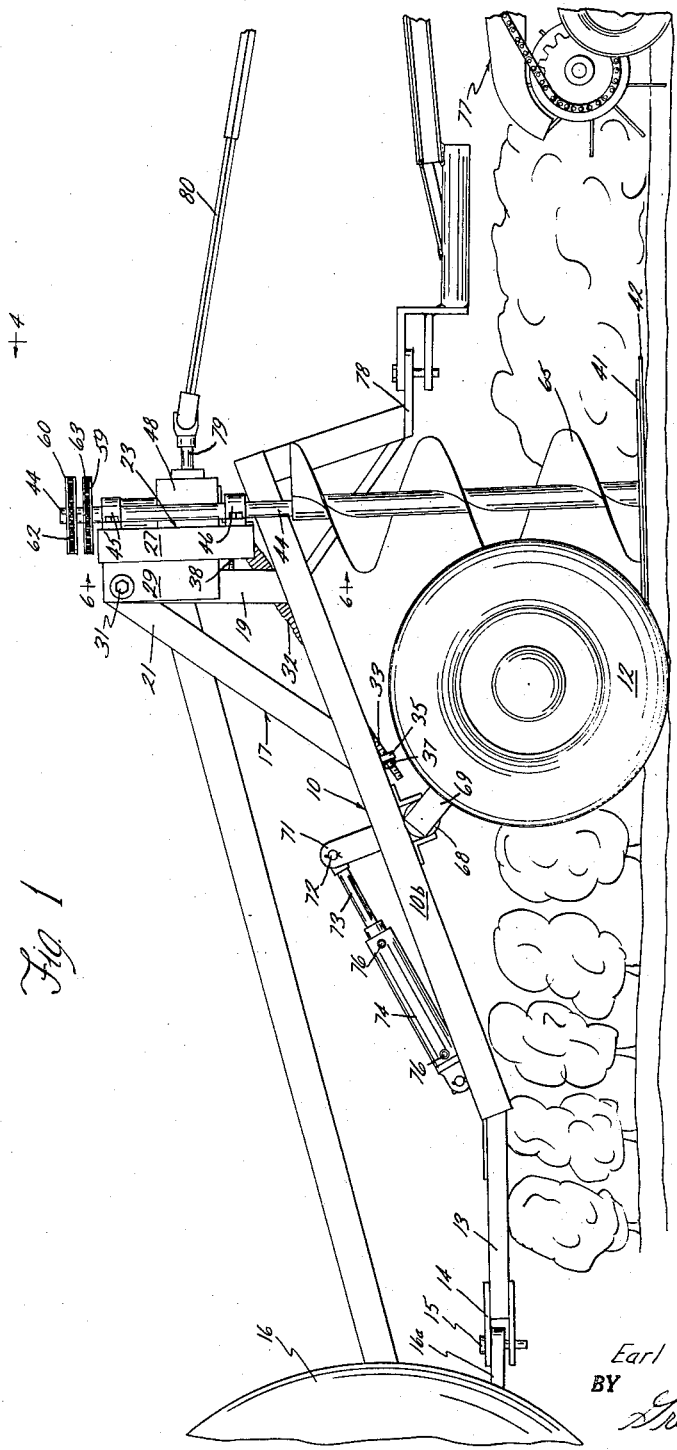
Figure 1 is a view in side elevation of a harvesting machine embodying my invention.
Figure 2:
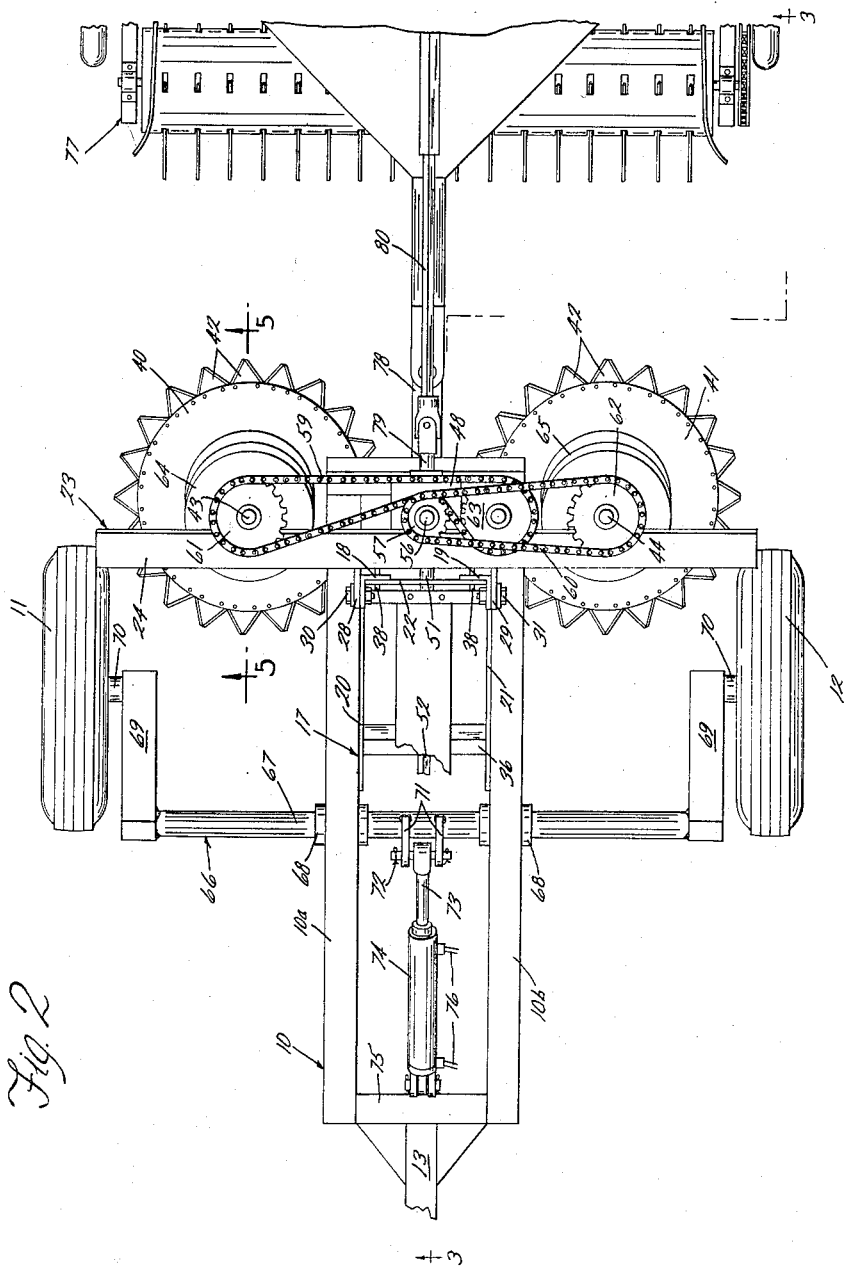
Figure 2 is a plan view of the device illustrated in Figure 1.

Referring now to the drawings and to Figures 1 and 2 in particular, my invention is shown as comprising a main rectangular inclined frame 10, supported on wheels 11 and 12. The frame 10 has a forwardly extending tongue or draw bar 13 which has a clevis 14 at its end adapted to be attached by a pin 15 to the draw bar 16a of a powered vehicle 16, such as a farm tractor, etc.

Figure 3:
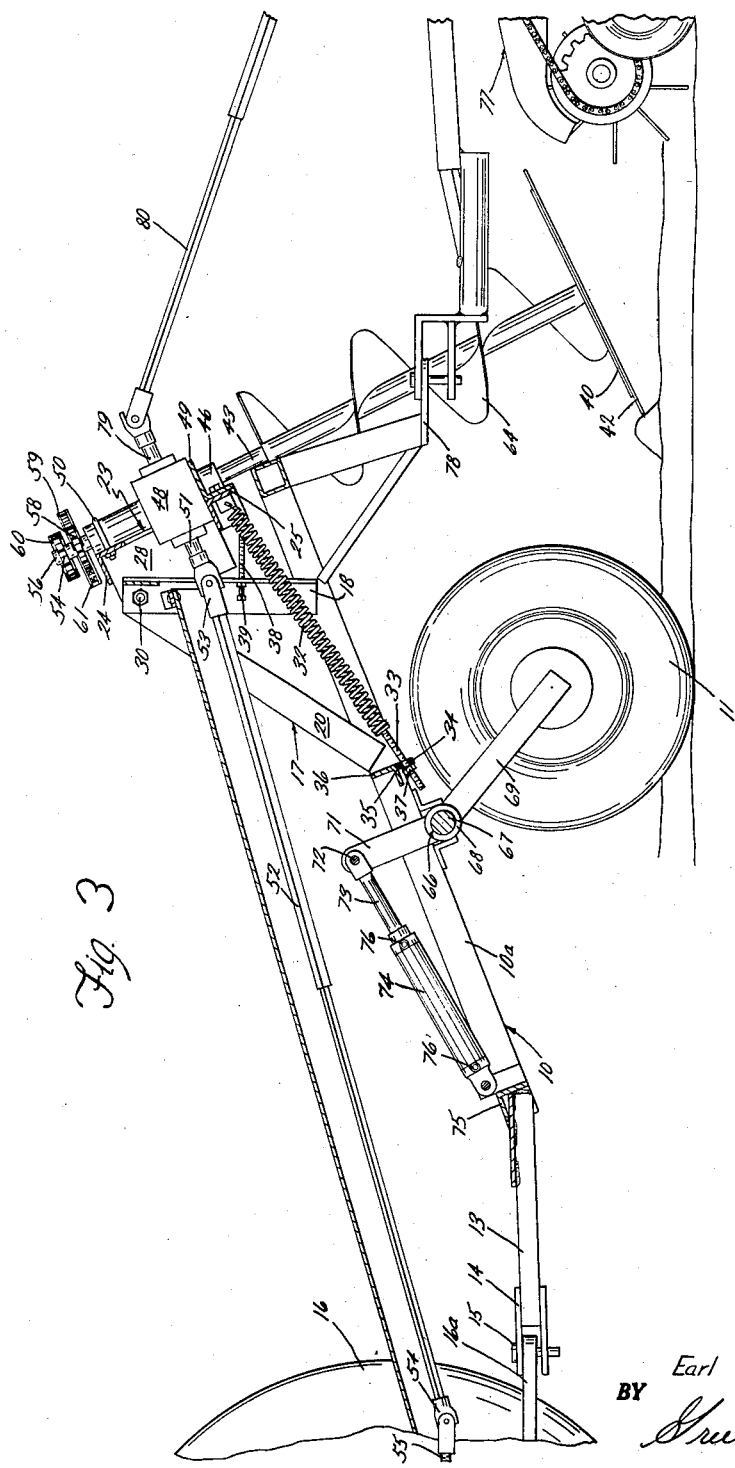
Figure 3 is a cross sectional view taken substantially on the line 3—3 of Figure 2, but showing the cutting mechanism pivoted rearwardly as when engaged with a submerged obstruction.

Upon the main frame 10, an upright frame 17 is provided. As best shown in Figures 1, 2 and 3, the upright frame 17 comprises a pair of vertical angle irons 18 and 19 secured to the longitudinal members 10a and 10b of the frame 10. Braces 20 and 21 extend forwardly and downwardly from the angle irons 18 and 19 to the frame 10, and a cross brace 22 extends between the angle irons 18 and 19 to complete the upright frame 17. The upright frame 17 pivotally supports a transverse vertical rectangular cutting assembly sub-frame 23 which in turn carries the cutting and windrowing mechanism of the harvester. As best shown in Figures 3 and 4, the subframe 23 is comprised of a pair of vertically spaced transverse frame members 24 and 25 tied together at their opposite ends by frame pieces 26 and 27. A pair of spaced apart forwardly extending plates 28 and 29 are fixed between the sub-frame members 24 and 25 intermediate the ends. The plates 28 and 29 are spaced apart a sufficient distance to receive the vertical frame 17 therebetween. Bolts 30 and 31 extend through the plates 28 and 29 near their upper forward edges and through the adjacent frame members 18 and 19 whereby to pivotally secure the sub-frame 23 to the upright frame 17. With this construction, the sub-frame 23 is free to pivot rearwardly and upwardly with respect to the main frame 10 upon the bolts 30 and 31. The sub-frame 23, however, is held in its normal vertical position by a spring 32 which extends from the lower sub-frame member 25 forwardly. The spring 32 is connected at its forward end to a tensioning bolt 33 which extends through an aperture 34 in a bracket 35 carried by a cross brace 36 on the frame 10. A nut 37 on the bolt 33 retains it in position with respect to the frame 10. Adjustment of the nut 37 results in adjustment of the tension of the spring 32. It will be obvious from examination of Figure 3 that rearward pivotal motion of the sub-frame 23 is resisted by the spring 33. The spring 33 urges the sub-frame 23 forwardly into engagement with a pair of adjustable stop bolts 38 which are threaded through nuts 39 fixed on the vertical frame members 18 and 19. The stop bolts 38 are adjustable with respect to the frame members 18 and 19 whereby to adjust the angular relation of the sub-frame 23 with the main frame 10, and consequently to adjust the angular relation of the cutting mechanism with respect to the ground, as will presently appear.

The actual cutting elements of the machine are two disks 40 and 41 which, as shown best in Figure 2, are positioned behind the wheels 11 and 12 in a substantially horizontal plane. The disks 40 and 41 are provided with conventional sickle sections 42 around their periphery, the sickle sections 42 providing the actual cutting edges. The disks 40 and 41 are affixed to the lower ends of shafts 43 and 44 which extend upwardly behind the transverse subframe 23. Each shaft 43 and 44 is rotatably supported on the sub-frame 23 by bearings 45 and 46 secured to the transverse sub-frame members 24 and 25. It will be noted that the members 24 and 25 are provided with a plurality of apertures 47 to permit lateral adjustment of the shafts 43 and 44. These shafts 43 and 44 are spaced apart a distance equal to or slightly greater than the distance from row center to row center of the crop to be harvested so that the disks 40 and 41 travel down adjacent rows, each cutting one row of plants.

In order to drive the disks 40 and 41, a power transmission unit 48 is provided. The transmission unit 48 is mounted on the sub-frame 23 between the forwardly extending plates 28 and 29 by a mounting bracket 49 and a U-bolt 50. The transmission unit 48 is powered from a drive shaft 51 which is connected through a universal drive shaft 52 and universal couplings 53 and 54 to the power take-off shaft 55 of the powered vehicle 16. The transmission unit 48 has a power output shaft 56 extending upwardly therefrom above and behind the subframe 23. The shaft 56 has a pair of drive pinions 57 and 58 thereon which, through chains 59 and 60, drive gears 61 and 62 fixed to the tops of shaft 43 and 44. The shafts 43 and 44 are rotated in opposite directions so that the disks 40 and 41 rotate in a direction to move their adjacent edges rearwardly. Therefore, it is necessary to provide an idler sprocket 63 on the sub-frame 23 around which the chain 59 extends, whereby to drive the gear 61 of the shaft 43 in a direction opposite to the direction of rotation of the power output shaft 56 and the shaft 44.

With the construction heretofore described, the disks 40 and 41 are carried along behind the frame 10 down the center of adjacent rows of crop and rotated in opposite directions so as to cut the crops and move them toward the area between the adjacent rows. The disks are adapted to cut below the ground level, and to move through the ridges of dirt which exist in the rows. It has been found that if the adjustable stop bolts 38 are adjusted so as to maintain the sub-frame at a slight angle to vertical, as shown in Figure 1, the disks 40 and 41 can be tilted so that their rearward portions are clear of the ground, while their forward portions run slightly beneath the ground surface. As shown in Figure 3, if the disks, or either of them, strike submerged obstructions such as stones, etc., they may pivot backwardly and upwardly with the subframe 23 about the pivots 30 and 31 to clear the obstruction without substantial damage. When they are clear of the obstruction, and under normal circumstances, the disks are maintained in normal operating position by the spring 32.

It is desirable, when cutting the crop, to move it into windrows, and to gather in those stems and branches which are growing outwardly from the plant upon the ground, so that the crop may be more easily picked up for further processing. With the present invention this is accomplished by auger sections 64 and 65 which are provided on the shafts 43 and 44, as shown in the drawings. The augers 64 and 65 are fixed on the shafts 43 and 44 and extend nearly to the sub-frame 23 so that the portions of the shafts 43 and 44 adjacent the crop are covered. The augers 64 and 65 are so constructed that rotation of the shafts 43 and 44 rotates the augers 64 and 65 in a direction to lift the crops engaged thereby and move them toward the center of the machine, whereby to form a windrow between the two rows of crop being cut. These augers also tend to lift the crops during the cutting operation to insure that none of the beans, etc. are injured.

It has been found that in different fields, crop conditions vary to such an extent that the cutting level of the disks 40 and 41 should be varied. Also in moving from field to field, it is desirable to elevate the disks 40 and 41 above the ground. In order to provide for simple and speedy height adjustment of the disks 40 and 41, the wheels 11 and 12 of the frame 10 are mounted on a crank axle, shown at 66 in the drawings. The axle 66 has a main transverse portion 67 which is rotatably mounted in sleeves 68 on the members 10a and 10b of the frame 10. At each end of the transverse axle portion 67 crank arms 69 are provided. The arms 69 carry the wheel mounting spindles 70 upon which the wheels 11 and 12 are mounted. At the center of the transverse axle portion 67, a pair of ears 71 are provided. The ears 71 mount a pin 72 to which the piston 73 of an hydraulic cylinder 74 is pivoted. The cylinder is supported on a bracket 75 fixed to the frame 10. The cylinder 74 is operated through fluid lines 76 which extend to a hydraulic pump (not shown) on the powered vehicle 16. With this construction, the frame 10 and consequently the disks 40 and 41 can be raised and lowered with respect to the ground by adjustment of the axle 66 by the cylinder 74.

Since it is desirable, when harvesting such crops as lima beans and the like, to pick up the crop immediately after cutting, and since it is not necessary to dry the crop in windrows, I provide means for attaching a loading device behind the cutting device, so that the powered vehicle 16 may draw both at once. The loading device, shown generally at 77, is attached to a draw bar 78 which is secured to and depends from the rear end of the main frame 10 for this purpose. A power take off shaft 79 is provided on the transmission unit 48 for driving a universal drive shaft 80 which powers the loader 77.

The invention hereinbefore described provides a novel and useful cutter for row grown vine crops such as lima beans, etc. The disks 40 and 41 operate to cut the plants below ground level and without undue soil disturbance or crop damage. The novel pivotal mounting of the frame 23 permits the disks 40 and 41 to operate effectively and yet protects them against substantial damage upon encountering stones, etc. in the ground. The mounting of the frame 23 also permits easy adjustment of the cutting angle of the disks 40 and 41 to give the best results with each crop. The vertical auger sections 64 and 65 operate to roll the cut crop into a neat windrow to provide for easy handling by the loader 77. The crank axle 66 and adjusting means therefor permit easy and rapid depth adjustment in the field.

It is believed that the nature and advantages of my invention appear clearly from the foregoing description and the accompanying drawings.

Having thus described my invention, I claim:

1. In a cutter of the character described, a main elongated rectangular frame inclined upwardly from front to rear, draw bar at the front of said frame for attachment to a towing vehicle, wheels mounted to said frame rearwardly of the draw bar for supporting it, means on the frame connected to the wheels for raising and lowering the frame on the wheels, an upright frame on the main frame, a transverse vertical rectangular sub frame pivotally suspended from said upright frame to swing forwardly and rearwardly lengthwise of the main frame, stop means on the upright frame limiting the forward swinging of the sub frame, spring means connected to the sub frame below its pivotal connection to the upright frame and extending forwardly and downwardly and connected to the main frame, said spring means being under tension to urge the sub frame toward said stop means, depending shaft means journalled on said sub frame and having disk means fixed to the lower end thereof adapted to run in the ground, said disk means having cutters around the periphery thereof, a drive shaft in said sub frame operably connected to said shaft means and a universal joint on the front end of said drive shaft for connecting to a power take-off from the towing vehicle, the spring means being yieldable to allow the disk means to swing rearwardly out of the ground.

2. The invention defined in claim 1 wherein the main frame has a draw bar at the rear end for attaching a crop pick up device.

References Cited in the file of this patent

UNITED STATES PATENTS

| | | |
|---|---|---|
| 1,397,365 | Cook | Nov. 15, 1921 |
| 1,442,032 | Luce et al. | Jan. 9, 1923 |
| 1,763,632 | Morgan | June 10, 1930 |
| 1,945,733 | Court | Feb. 6, 1934 |
| 2,187,833 | Lock et al. | Jan. 23, 1940 |
| 2,648,943 | Shafer | Aug. 18, 1953 |
| 2,723,522 | Pool | Nov. 15, 1955 |
| 2,748,535 | Skromme et al. | June 5, 1956 |
| 2,748,552 | Pool | June 5, 1956 |

FOREIGN PATENTS

| | | |
|---|---|---|
| 619,713 | Great Britain | Mar. 14, 1949 |